(12) United States Patent
Liao

(10) Patent No.: US 10,685,444 B2
(45) Date of Patent: *Jun. 16, 2020

(54) METHOD FOR PANORAMA IMAGE PROCESSING

(71) Applicant: AMBIT MICROSYSTEMS (SHANGHAI) LTD., Shanghai (CN)

(72) Inventor: Tzu-Fong Liao, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,943

(22) Filed: Jul. 30, 2019

(65) Prior Publication Data

US 2019/0355123 A1 Nov. 21, 2019

Related U.S. Application Data

(63) Continuation of application No. 15/687,749, filed on Aug. 28, 2017, now Pat. No. 10,445,882.

(30) Foreign Application Priority Data

Aug. 22, 2017 (CN) .......................... 2017 1 0724997

(51) Int. Cl.
| | |
|---|---|
| *H04N 5/232* | (2006.01) |
| *G06T 7/13* | (2017.01) |
| *G06T 7/174* | (2017.01) |
| *G06T 7/32* | (2017.01) |
| *G06T 7/33* | (2017.01) |
| *G06T 3/40* | (2006.01) |

(52) U.S. Cl.
CPC .............. *G06T 7/13* (2017.01); *G06T 3/4038* (2013.01); *G06T 7/174* (2017.01); *G06T 7/33* (2017.01); *G06T 7/32* (2017.01); *G06T 2207/20221* (2013.01); *H04N 5/23238* (2013.01)

(58) Field of Classification Search
CPC ......... G06T 2207/20221; G06T 3/4038; G06T 7/13; G06T 7/174; G06T 7/32; G06T 7/33; H04N 5/23238
See application file for complete search history.

(56) References Cited

U.S. PATENT DOCUMENTS

| | | | | |
|---|---|---|---|---|
| 10,445,882 | B2* | 10/2019 | Liao | ........................ G06T 7/174 |
| 2013/0208997 | A1* | 8/2013 | Liu | ........................... G06T 3/20 |
| | | | | 382/284 |
| 2013/0329002 | A1* | 12/2013 | Tico | ...................... G06T 3/4038 |
| | | | | 348/36 |

(Continued)

*Primary Examiner* — Kenny A Cese
(74) *Attorney, Agent, or Firm* — ScienBiziP, P.C.

(57) ABSTRACT

An image processing method for obtaining a panoramic image includes obtaining a first image and a second image by a camera unit, and obtaining location information between the viewpoints of the first image and the second image by a gyro. First features of the first image and second features of the second image are obtained according to a feature-capturing algorithm when pixel brightness differences exceed a threshold. Predicted features in the second imam are obtained by the location information, and predicted features that exceed a predetermined distance from the second features are discarded. A panorama image is obtained by combining the first image and the second image according to the first features and the selected second features.

5 Claims, 5 Drawing Sheets

(56) References Cited

U.S. PATENT DOCUMENTS

| | | | |
|---|---|---|---|
| 2014/0300775 A1* | 10/2014 | Fan | H04N 5/23229 348/231.3 |
| 2015/0288933 A1* | 10/2015 | Iversen | G06F 3/147 348/14.07 |
| 2016/0088287 A1* | 3/2016 | Sadi | G03B 35/08 348/43 |

* cited by examiner

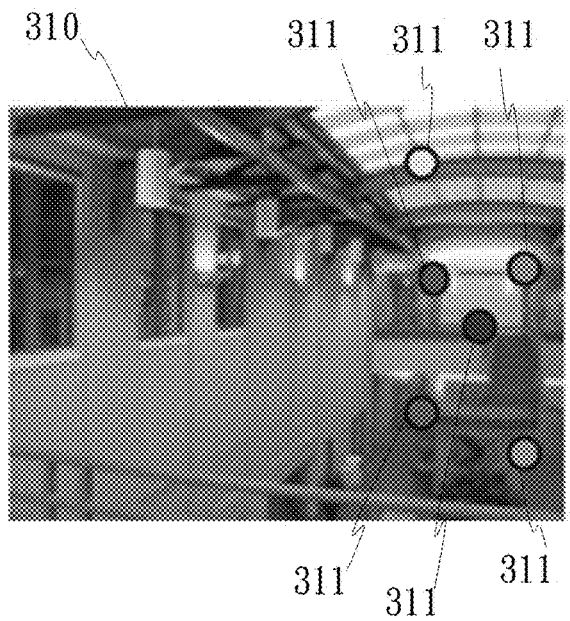
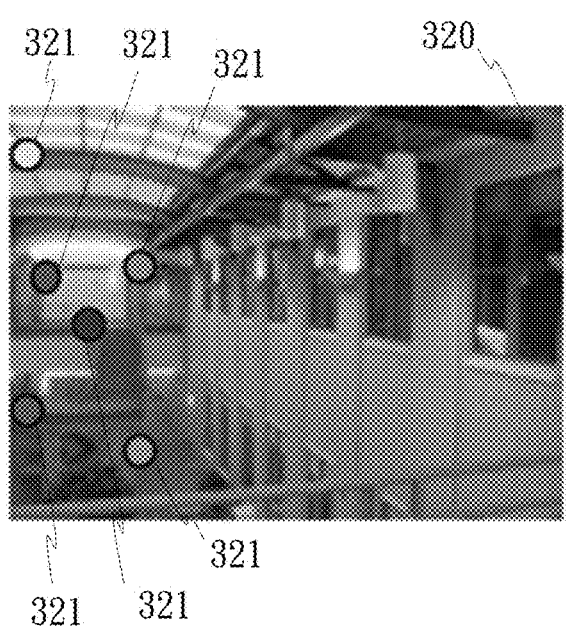
FIG. 3A　　　　　　　　　　FIG. 3B
FIG. 3C

METHOD FOR PANORAMA IMAGE PROCESSING

FIELD

The subject matter herein generally relates to an image processing method, especially improve edge detection when capturing panoramic photographs.

BACKGROUND

Panoramic photography can be achieved through the horizontal rotation of the camera to shoot multiple continuous images. The multiple continuous images are spliced into a complete image of a complete panoramic image by the software. Users are required to take shots in accordance with a certain order and must pay attention to maintain the same rotational direction. For ordinary users, it is difficult to control the consistent rotation of the camera without using tripods. Therefore, improvements in the art is preferred.

SUMMARY

In the present disclosure, first features of a first image and second features of a second image are obtained by edge detection. Predicted features are performed on the second image by a gyroscope (gyro). The first features and the second features are matched by Euclidean distance and removing the predicted features that exceed a predetermined distance from the second features to improve accuracy. The rotation matrix relationship between the first image and the second image are calculated by Euler angle. The first image and the second image are correlated according to the calculations to form a panoramic image. This overcomes the limitation of rotation angle consistency when taking images by the rotation matrix relationship with the same value features.

An image processing device for a panorama image includes a camera unit, which captures a first image and a second image. A gyro receives location information of the image processing device. When brightness difference exceeds a threshold, a processor receives the first image and the second image to generate a plurality of first features of the first image and a plurality of second features of the second image according to a feature-capturing algorithm. Predicted features in the second image are obtained by the location information and the predicted features that exceed a predetermined distance from the second features are discarded. The panorama image is produced by combining the first image and the second image according to the first features and the selected second features.

An image processing method for a panorama image includes capturing a first image and a second image by a camera unit, and receiving location information of the image processing device from a gyro. A plurality of first features of the first image and a plurality of second features of the second image are obtained according to a feature-capturing algorithm when brightness difference exceeds a threshold. Predicted features in the second image are obtained by the location information and the predicted features that exceed a predetermined distance are discarded from the second features, to obtain the panorama image by combining the first image and the second image according to the first features and the selected second features.

BRIEF DESCRIPTION OF THE DRAWINGS

Implementations of the present technology will now be described, by way of embodiment, with reference to the attached figures, wherein:

FIG. 3A illustrates a first image according to the embodiment of the disclosure;

FIG. 3B illustrates a second image according to the embodiment of the disclosure;

FIG. 3C illustrates a third image according to the embodiment of the disclosure;

DETAILED DESCRIPTION

Figure 1:
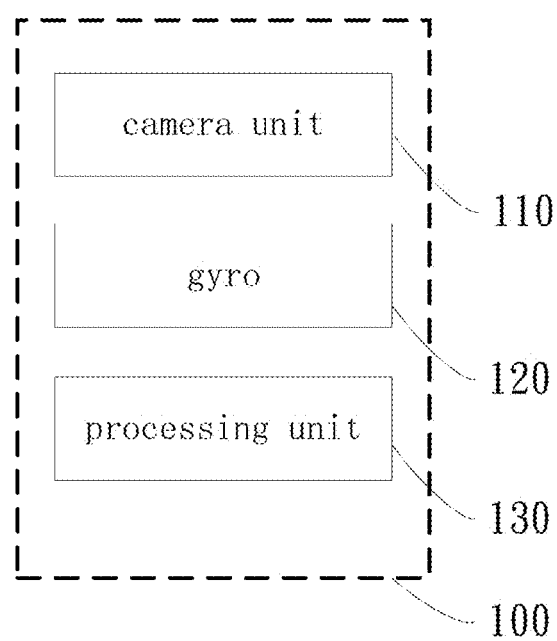
FIG. 1 illustrates a functional block diagram of an image processing device according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. The term "comprising," when utilized, is "including, but not necessarily limited to"; it specifically indicates open-ended inclusion or membership in the so-described combination, group, series, and the like. References to "an" or "one" embodiment in this disclosure are not necessarily to the same embodiment, and such references mean "at least one."

FIG. 1 illustrates a functional block diagram of an image processing device according to an embodiment of the disclosure. As shown in FIG. 1, the image processing device 100 for achieving panoramic images comprises a camera unit 110, a gyroscope (gyro) 120, and a processor 130. The camera 110 captures a first image and a second image. The gyro 120 receives location information of the image processing device 100. The processor 130 receives the first image and the second image to generate first features and second features according to a feature-capturing algorithm. The feature-capturing algorithm in this invention is FAST algorithm (Features from Accelerated Segment Test). FAST algorithm is a corner detection method, which could be used to extract features and later used to track and map objects in many computer vision tasks. FAST algorithm generates features according to the brightness of pixels. The feature is defined as the pixels that exceed the threshold of the FAST algorithm. FAST algorithm uses a circle of 16 pixels to classify whether a candidate point is actually a corner. Each pixel in the circle is labeled from the integer 1 to 16 in a clockwise direction. When a set of N contiguous pixels in the circle are all brighter than the intensity of candidate pixel and exceeding the threshold or are all darker than the intensity of candidate pixel and less than the threshold, then the pixel is classified as the corner. The threshold value can be defined by users. The processor 130 obtains location information of predicted features on the second image by gyro 120. The first features and the second features are transferred to a 3D space. The distances between the predicted features and the second features are calculated according to Euclidean distance. The processor 130 obtains selected second features by discarding the predicted features, which exceed a predetermined distance from the second features, and produces the panorama image by combining the first image and the second image according to the first features and the selected second features.

Furthermore, the distribution of features in one image will vary depending on the complexity of the captured image. Edge-detection is easy when the image is simple, but needs more features to distinguish the edges when the image is complicated. The processor 130 splits the image as a plurality of sub-images and updates the threshold of feature-capturing algorithm on each sub-image. This improves accuracy of generating the panoramic image and increases efficiency of the operation by obtaining more representative features.

Figure 2:
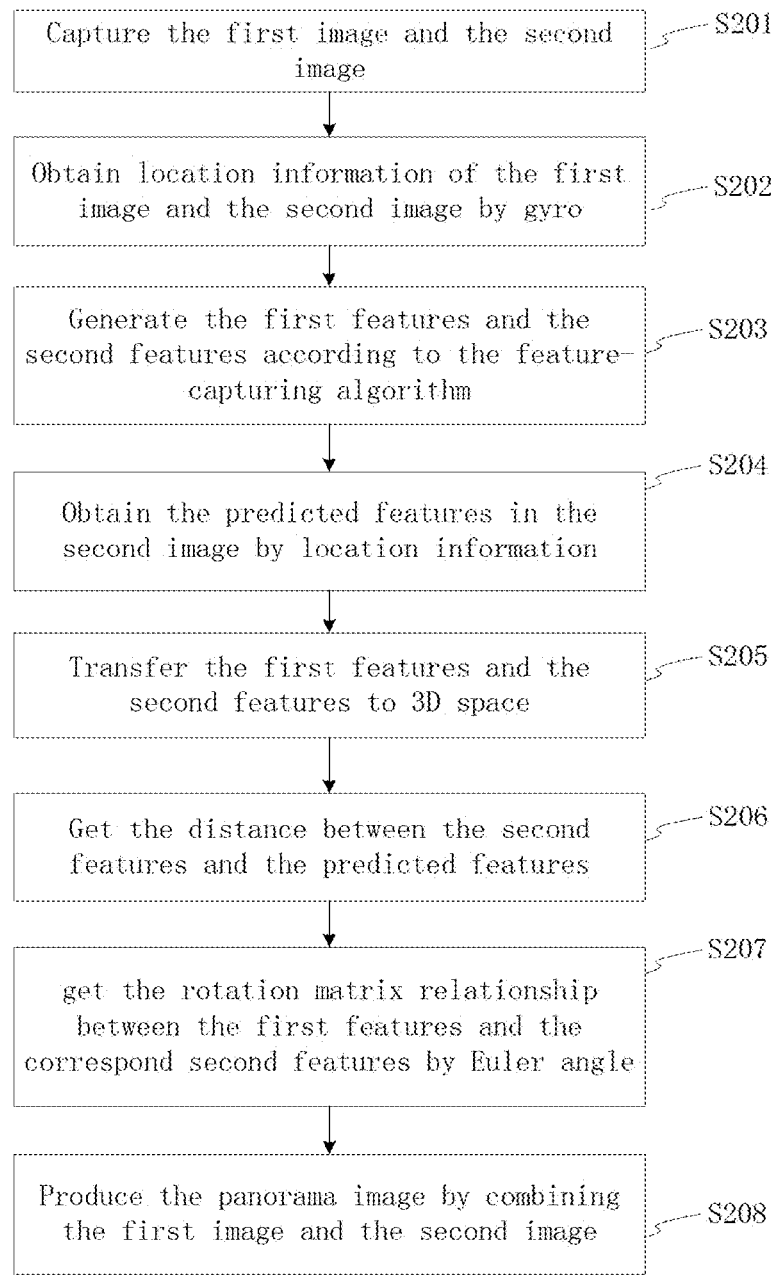
FIG. 2 illustrates a flow diagram of an image processing method according to an embodiment of the disclosure.

FIG. 2 illustrates a flow diagram of an image processing method according to an embodiment of the disclosure. As shown in FIG. 2, the camera unit captures the first image and the second image (S201). The gyro obtains location information of the first image and the second image (S202). The feature-capturing algorithm generates the first features and the second features when the brightness exceeds the threshold (S203). The predicted features in the second image are obtained by location information (S204). The first features and the second features are transferred to 3D space to confirm the first features and the second features are in the same 3D space (S205). The distances between the second features and the predicted features are obtained according to Euclidean distance. Second features are discarded when the distances between the second features and the predicted features exceed a predetermined distance (S206). A rotation matrix between the first features and the second features is obtained according to Euler angles (S207). The processor combines the first features and the second features according to the rotation matrix (S208).

FIG. 3A illustrates a first image 310 according to the embodiment of the disclosure. As shown in FIG. 3A, the first image 310 is captured by the image processing device. The first features 311 are obtained according to the feature-capturing algorithm (the features in FIG. 3A are only for an example).

FIG. 3B illustrates a second image 320 according to the embodiment of the disclosure. As shown in FIG. 3B, the second image 320 is captured by the user holding the image processing device 100 moving a distance away from the viewpoint of the first image 310 in FIG. 3A. The location information is obtained according to the gyro 120. The processor 130 obtains the predicted features according to the location information and obtains the second features 321 according to the feature-capturing algorithm. The processor 130 discards the second features 321 that exceed a predetermined distance between the second features 321 and the location of the predicted features.

FIG. 3C illustrates a third image 330 according to the embodiment of the disclosure. As shown in FIG. 3C, the panorama image is the result of combining the first image 310 in FIG. 3A and the second image 320 in FIG. 3B. The second features 321 in the second image 320 are correspond to the first features 311 in the first image 310. The rotation matrix between the first features 311 and the corresponding second features 321 is formed by combining the relationship according to Euler angles. The panorama image is obtained according to the rotation matrix relationship between the first image 310 and the second image 320.

Figure 4:
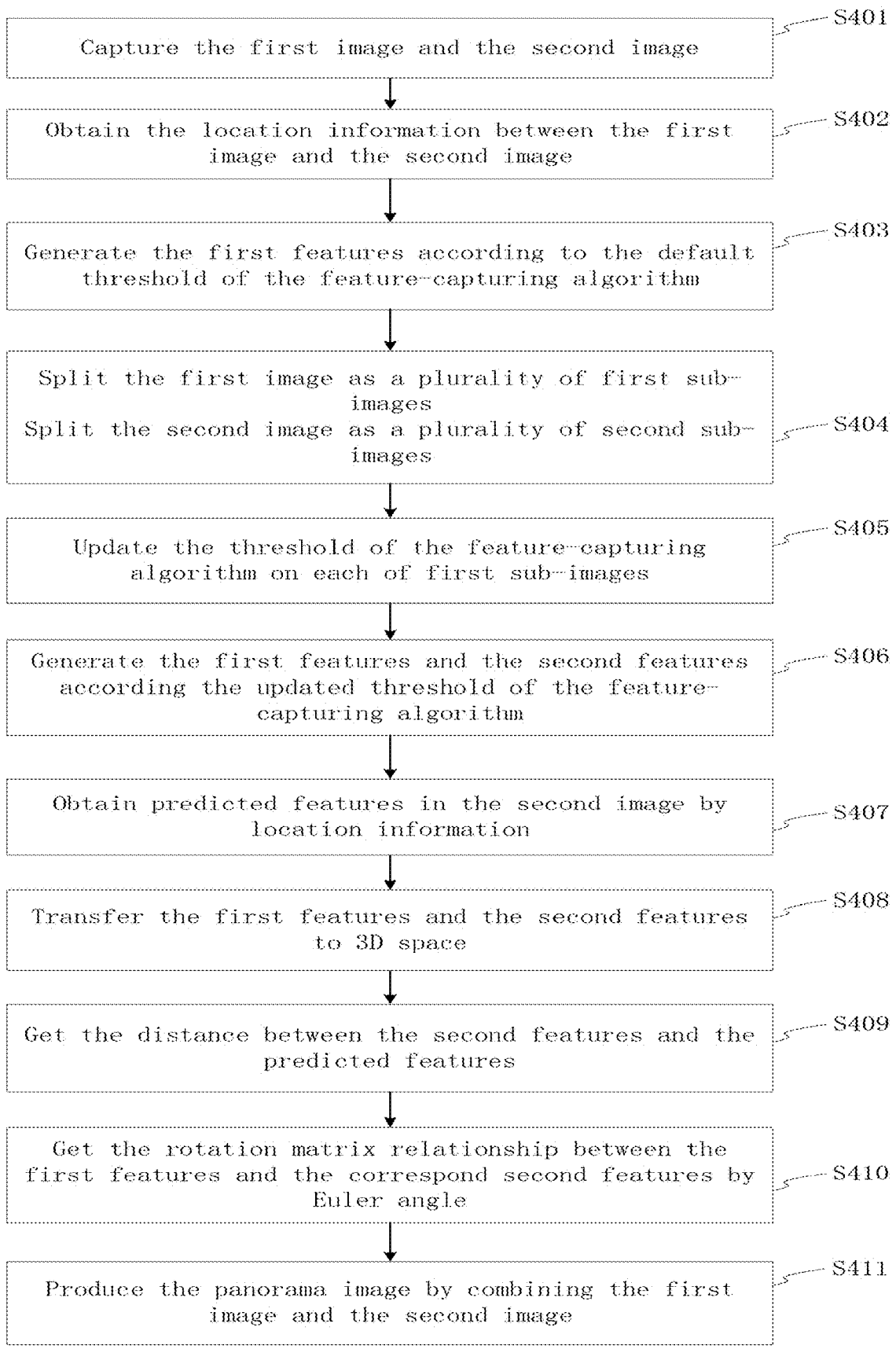
FIG. 4 illustrates another flow diagram of the image processing method according to an embodiment of the disclosure.

FIG. 4 illustrates another flow diagram of the image processing method according to an embodiment of the disclosure. As shown in FIG. 4, the camera unit captures the first image and the second image (S401). The location information between the first image and the second image is obtained by the gyro (S402). The feature-capturing algorithm generates the first features according to the default threshold of the feature-capturing algorithm (S403). The processor splits the first image into a plurality of first sub-images and the second image into a plurality of second sub-images. The second image is split in the same manner as the first image (S404). The feature-capturing algorithm recalculates an updated threshold according to the numbers of the first features. The first features in the first sub-image are representative when the numbers of the first features are less than the average. The feature-capturing algorithm raises the threshold to obtain fewer first features, to improve the efficiency of the operation. Conversely, the first sub-image is more complicated when the numbers of the first features are larger than the average. The feature-capturing algorithm reduces the threshold to detect the edges of the first sub-image (S405). The feature-capturing algorithm generates the first features and the second features according to the updated threshold (S406). The predicted features in the second image are obtained by location information (S407). The first features and the second features are transferred to 3D space to make sure the first features and the second features are in the same space (S408). The distances between the second features and the predicted features are obtained according to Euclidean distance. The second features are discarded when the distances between the second features and the predicted features exceed a predetermined distance (S409). The rotation matrix between the first features and the second features is obtained according to Euler angles (S410). The processor combines the first features and the second features according to the rotation matrix (S411)

Figure 5:
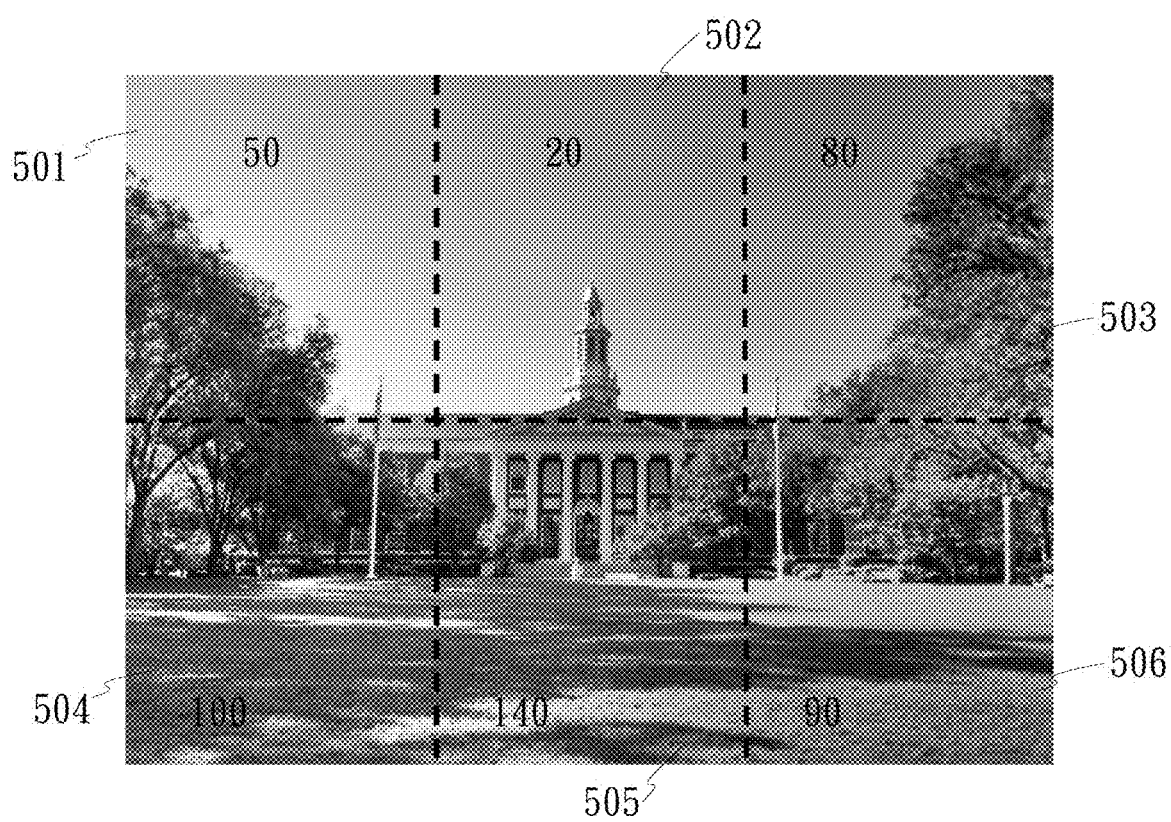
FIG. 5 illustrates an updated threshold of sub-images of the image processing method according to an embodiment of the disclosure.

FIG. 5 illustrates an updated threshold of sub-images of the image processing method, according to an embodiment of the disclosure. As shown in FIG. 5, the image is split into 3×2 sub-images. The default threshold of the feature-capturing algorithm is 50. The feature-capturing algorithm obtains 50 features in the first sub-image 501, 20 features in the second sub-image 502, 80 features in the third sub-image 503, 100 features in the fourth sub-image 504, 140 features in the fifth sub-image 505, and 90 features in the sixth sub-image 506. The feature-capturing algorithm adjusts the updated thresholds in each sub-image. The processor obtains 80 as the average number and the standard deviation is 41.47 according to the number of the features in each sub-images. The processor obtains Z value and P value according to the average number and the standard deviation in each sub-image. When the number of features of the sub-image is less than the average, the threshold is multiplied by the reciprocal of P value. When the number of features of the sub-image is larger than the average, the threshold is multiplied by the P value. The first sub-image 501 and the fifth sub-image 505 are taken as an example. Z1 is a value of the first sub-image 501. In this example, Z1 is |(50−80)/41.47|=0.74. P1 is a value of the first sub-image 501. In this example, P1 is 0.77. Z5 is a value of the fifth sub-image 505. In this example, Z5 is 1.45. P5 is a value of the fifth sub-image 505. In this example, P5 is 0.92. The numbers of first features is 50, which is less than the average of 80. Thus, the updated threshold of the first sub-image is obtained by multiplying default threshold and the reciprocal of P1 [50*(1/0.77)= 64.9]. The number of the fifth features is 140, which is larger than the average of 80. Thus, the updated threshold of the fifth sub-image is obtained by multiplying a default threshold and the P5 [50*0.92=46].

Users should maintain a specific posture when taking the panorama images. The image processing device and the method improve ease and convenience by comparing the predicted features and the second features. The panorama image is obtained by combining the first image and the second image. Furthermore, the image is split into many sub-images to adjust the number of features according to the differences of the images. In this way, the image processing method enhances the accuracy of synthetic images and reduces image processing time, being applicable to all handheld image processing devices, such as mobile phones, pad, digital cameras, etc.

The embodiments shown and described above are only examples. Therefore, many details of such art are neither shown nor described. Even though numerous characteristics and advantages of the technology have been set forth in the foregoing description, together with details of the structure and function of the disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An image processing device for a panorama image, comprising:
    a camera unit capturing a first image and a second image; and
a processor receiving the first image and the second image, generating a plurality of first features of the first image and a plurality of second features of the second image according to a feature-capturing algorithm when a brightness difference between the first image and the second image exceeds a threshold, producing the panorama image by combining the first image and the second image according to the first features and the second features; wherein the processor splits the first image into a plurality of first sub-images of a same size which is smaller than the first image and the processor splits the second image into a plurality second sub-images of a same size which is smaller than the second image; the processor updates the threshold of the feature-capturing algorithm on each of the first sub-images according to a first numbers of the first features, wherein the threshold is raised when the first numbers of the first features on the first sub-image is less than an average of a second numbers of the first features on each of the first and the second sub-images, the threshold is reduced when the first number of the first features on the first sub-image is more than the average of the second numbers of the first features on each of the first and the second sub-images.

2. The image processing device as claimed in claim 1, wherein the feature-capturing is a Features from Accelerated Segment Test (FAST) algorithm.

3. The image processing device as claimed in claim 1, wherein the processor obtains a rotation matrix between the first features and the corresponding second features according to Euler angles, and produces the panorama images according to the rotation matrix to combine the first image and the second image.

4. An image processing method, for producing a panorama image, comprising:
    capturing a first image and a second image by a camera unit;
    obtaining a plurality of first features of the first image and a plurality of second features of the second image according to a feature-capturing algorithm when a brightness difference between the first image and the second image exceed a threshold; and
    producing the panorama image by combining the first image and the second image according to the first features and the second features;
    splitting the first image into a plurality of first sub-images of a same size which is smaller than the first image and the second image into a plurality second sub-images of a same size which is smaller than the second image; and
updating the threshold of the feature-capturing algorithm on each of the first sub-images according to a first numbers of the first features, wherein the threshold is raised when the first number of the first features on the first sub-image is less than an average of a second numbers of the first features on each of the first and the second sub-images, the threshold is reduced when the first number of the first features on the first sub-image is more than the average of the second numbers of the first features on each of the first and the second sub-images.

5. The image processing method as claimed in claim 4, further comprising obtaining a rotation matrix between the first features and the corresponding second features according to Euler angles, and producing the panorama images according to the rotation matrix to combine the first image and the second image.

* * * * *